United States Patent
Watzke (10) Patent No.: US 12,171,628 B2
(45) Date of Patent: Dec. 24, 2024

(54) DENTAL BLOCK FORMING A BLANK FOR A PARTIAL PROSTHESIS, DENTAL PARTIAL PROSTHESIS AND METHOD OF MANUFACTURING A DENTAL PARTIAL PROSTHESIS

(71) Applicant: Ivoclar Vivadent AG, Schaan (LI)

(72) Inventor: Ronny Watzke, Feldkirch (AT)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 17/817,949

(22) Filed: Aug. 5, 2022

(65) Prior Publication Data

US 2023/0045846 A1 Feb. 16, 2023

(30) Foreign Application Priority Data

Aug. 10, 2021 (EP) .................. 21190668

(51) Int. Cl.
*A61C 13/01* (2006.01)
*A61C 13/00* (2006.01)
*A61C 13/08* (2006.01)

(52) U.S. Cl.
CPC ...... *A61C 13/0004* (2013.01); *A61C 13/0022* (2013.01); *A61C 13/01* (2013.01); *A61C 13/082* (2013.01); *A61C 2201/002* (2013.01); *A61C 2204/005* (2013.01)

(58) Field of Classification Search
None
See application file for complete search history.

(56) References Cited

U.S. PATENT DOCUMENTS

| 4,970,032 | A | 11/1990 | Rotsaert |
| 5,939,211 | A | 8/1999 | Mörmann |
| 2009/0026643 | A1 | 1/2009 | Wiest et al. |
| 2014/0087327 | A1 | 3/2014 | Noack |
| 2016/0089221 | A1 | 3/2016 | Christen et al. |
| 2016/0220337 | A1 * | 8/2016 | Steger ............... A61C 13/0022 |
| 2018/0071063 | A1 * | 3/2018 | Watzke ............... A61C 13/082 |
| 2020/0015944 | A1 * | 1/2020 | Geier ............... A61C 13/0022 |
| 2020/0197140 | A1 * | 6/2020 | Hagenbuch ........ A61C 13/0022 |
| 2021/0128283 | A1 * | 5/2021 | Kato ..................... A61C 13/26 |
| 2021/0196437 | A1 * | 7/2021 | Seger ..................... C03C 3/097 |

FOREIGN PATENT DOCUMENTS

| DE | 837288 B1 | 4/1952 | |
| DE | 102006010665 A1 | 9/2007 | |
| WO | 91/07141 A1 | 5/1991 | |
| WO | WO-2013072287 A1 * | 5/2013 | ......... A61C 13/0022 |
| WO | WO-2019035467 A1 * | 2/2019 | ......... A61C 13/0004 |

* cited by examiner

*Primary Examiner* — Mary I Omori
(74) *Attorney, Agent, or Firm* — Ann M. Knab; Thad McMurray (57) ABSTRACT

The present invention relates to a dental blank, in particular a parallelepipedal block, having an upper surface and a lower surface, which is composed of a flesh-coloured material and a tooth-coloured material. The flesh-coloured material and the tooth-coloured material are bonded together. The interface between the materials with elevations and depressions formed in or at the interface extends through an optionally curved plane, which plane is parallel to or oblique to at least a portion of the surfaces of the blank.

4 Claims, 5 Drawing Sheets

DENTAL BLOCK FORMING A BLANK FOR A PARTIAL PROSTHESIS, DENTAL PARTIAL PROSTHESIS AND METHOD OF MANUFACTURING A DENTAL PARTIAL PROSTHESIS

CROSS-REFERENCE TO RELATED APPLICATIONS

This application claims priority to European patent application No. 21190668.0 filed on Aug. 10, 2021, which disclosure is incorporated herein by reference in its entirety.

TECHNICAL FIELD

The invention relates to a block with an upper and a lower surface, a dental blank with an upper and a lower surface, a dental partial prosthesis and a method for preparing a dental partial prosthesis.

BACKGROUND

It has long been known to build prostheses, but also teeth, from several layers. Examples of this are the solutions known from WO 90/13268 A1 and corresponding U.S. Pat. No. 4,970,032A, which is incorporated by reference in its entirety, and WO 91/07141 A1.

For dental prostheses, on the one hand, a good material compatibility and on the other hand a slim design of the prosthesis or partial prosthesis is desirable. In order to ensure a secure anchoring of the teeth in the dental prosthesis, these are typically bonded or inserted in an injection moulding process. A solution in this regard can be seen in DE 837 288 B1.

A partial prosthesis must enable continued secure anchoring in the patient's jaw. For this purpose, metal scaffolds are often embedded, which allow fixation on the neighbouring teeth or on implants in the patient's jaw.

Currently, several process steps are required for the production of such partial prostheses. First, a framework made of metal or, if necessary, plastic must be created, which is then embedded in a wax model. Subsequently, this wax model is replaced by the prosthesis material, for example in a casting process or via the lost wax process. Subsequently, the partial prosthesis is finished and polished. Such a multi-step method is known, for example, from WO 2007/060142 A1, and corresponding US 20090026643 A1, which is hereby incorporated by reference in its entirety.

As described, partial prostheses consist of several parts and different materials. The size of partial prostheses depends on the respective dental situation of a patient. Compared to a full prosthesis, this can be very different for each individual, as each patient has a different number and extent of gaps.

Since the modelling of the gingiva and tooth parts in wax as well as the transfer to the final prosthesis is error-prone and time-consuming, working with several models can very easily lead to transfer errors. The production of partial prostheses is therefore time-consuming and very error-prone due to the large number of materials and work steps.

SUMMARY

Therefore, the invention is based on the object of creating a block with an upper and a lower surface, a dental blank with an upper and a lower surface, a dental partial prosthesis and a method for preparing a dental partial prosthesis, which, on the one hand, is inexpensive and quick to manufacture and, on the other hand, has a lower susceptibility to errors and is also optimized with regard to storage options.

According to the invention, it is provided that the partial prosthesis is made from a specially designed blank. The blank is two-coloured and consists of a gum-coloured (pink to reddish) material and a tooth-coloured (whitish to beige) material, each based on plastics or a ceramic material, which are bonded to each other in a form according to the invention. This intensive bonding can be achieved, for example, by adhesive bonding or also by polymerisation. It is also possible that the two materials are held together only by means of a pressing device, such as one or more screw clamps, but can be separated at any time.

The one-piece and inseparable production can be achieved, for example, by pressing the materials against each other in a state that is still soft—or even liquid—at the interface, so that they penetrate into each other from a microscopic point of view. However, the transition area is also in this type of production in the submillimetre range, for example less than 100 μm thick.

During polymerisation, such a transition range also exists in the same order of magnitude, and during adhesive bonding, the adhesive joint can have a small thickness between, for example, 40 and 200 μm.

The materials preferably consist of a polymer, in particular PMMA, but other materials such as ceramics, in particular zirconium dioxide, or metals are conceivable. It is also possible to use two different materials.

According to the invention, the blank is designed as a two-coloured block or as a two-coloured disc or as an essentially disc-shaped, in particular flat cylindrical, blank with an upper and a lower surface. By disc is to be understood, for example, a block with a flat shape, which is particularly rounded, or even round. Such a two-colour disc can be, for example, a (flat) cylinder in which the height is much lower than the radius. This height of the cylinder can extend in the axis of rotation of the cylinder and would be designated in Schoenflies symbolism by C∞, where "C" means cyclical and the index indicates the countability, i.e. here ∞ for the rotational symmetry. The plane that crosses the interface between the two materials is perpendicular to the height, i.e. perpendicular to the axis of rotation of the cylinder and therefore corresponds to a rotation surface or rotating surface.

In an advantageous embodiment, the blank is a block or a disc-shaped body. This can be non-circular, in particular polygonal, but also round. A polygonal shape can be realised, for example, by a flat cuboid or geometrically similar body in which one of the sides is shorter than the other two. However, other, in particular flat, polyhedra such as a uniformly equilateral octagonal antiprism or a uniformly equilateral, e.g. decagonal, antiprism are also possible without leaving the scope of the invention.

The interface between the materials of the blank extends along the plane but need not be flat or planar in shape. In a preferred embodiment, the plane in which the interface lies is arranged parallel to one of the possibly flat upper or lower surfaces of the blank or block, in particular to one which has the largest surface area. However, this plane can also lie diagonally in the blank. If the surfaces are not flat but, for example, curved or structured, the plane may extend substantially parallel or parallel to part of the surface. By "substantially parallel" is meant here and otherwise an extension with a small angular deviation from parallelism, with preferably less than 20 degrees, more preferably less than 10 degrees and in particular less than 5 degrees.

In a further embodiment, it is provided that the plane of the interface between the materials of the blank itself is not flat but has a curvature. The interface between the materials of the blank in this case can be compared to a vault, a cone or a pyramid. In particular, a course corresponding to the Spee curve is preferred.

The flesh-coloured material has elevations and depressions at the interface between the two materials, each of which protrudes from the plane. The vertices of a depression or an elevation each form a line, in particular a straight line, which runs parallel or at least approximately parallel to the interface. Furthermore, the individual vertex lines of the elevations and depressions each run essentially parallel to each other.

Each of the partial prostheses is preferably machined, in particular milled, from a region of the blank which extends over one or more elevations and depressions.

In a further embodiment, the vertex lines are curved or jagged or have straight areas as well as curved or serrated areas.

The lines are preferably spaced at a constant distance from each other, but it is also possible for the spacing between adjacent vertex lines to be different. For example, it is possible that the distance of the vertex lines, which are closer to the centre of the interface, decreases and increases outwards, i.e. towards the edge of the blank.

However, irregular arrangements of the distances are also advantageous, i.e. areas of the blank which show wide distances between the vertex lines as well as areas of the blank which show very narrow distances between the vertex lines.

In a further embodiment, the essentially straight vertex lines are not parallel but arranged in a fan shape, so that the distances between the vertex lines are narrower on one side of the blank and wider on the opposite side of the blank.

The shape of the partial prosthesis itself can be chosen in any suitable manner. The extension of the partial prosthesis is preferably over several lines, but an arrangement over only one vertex line, more precisely a vertex line of a depression of the flesh-coloured material, is also possible.

Preferably, the tooth-coloured material at the interface between the two materials has exactly the negative shape to the flesh-coloured material. Thus, the interface between the materials has elevations and depressions, so that the two materials interlock and are interlocked, as it were.

In advantageous embodiment, the flesh-coloured material can be polymerized on the tooth-coloured material. In a further embodiment, as already described above, there is a layer of adhesive, joining or composite material between the two materials in order to firmly connect the two materials. It may also be particularly advantageous to join the two materials using additive processes or by press-fitting or other joining techniques.

If one considers the blank in the cross-section through both materials, i.e. perpendicular to the plane, wherein it is assumed here that the flesh-coloured material is at the bottom and the tooth-coloured material is at the top and which cross-section preferably runs through the centre of the blank and perpendicular to the lines, the flesh-coloured material at the interface shows increases and depressions, which are preferably not symmetrical. The elevations of the flesh-coloured material are more tapered, while the depressions of the flesh-coloured material are more rounded. In this respect, in the side view vertices are present, and from these downward stretching oblique areas, which form slopes and run out in valleys. This design resembles a series of Us or a chain line. This design according to the invention of the interface of the block, blank or the partially processed prosthesis makes it possible to easily define the shape and course of the teeth and/or gums for the final prosthesis in such a way that a natural human gingival margin can be represented without great effort during the manufacturing process of the final prosthesis.

In this cross-section, the tooth-coloured material shows exactly the negative shape to the flesh-coloured material at the interface between the two materials. This supports the strength and resistance of the connection, especially an adhesive joint, between the two materials against forces acting on it, for example, during further processing of the blank, but also during everyday use of the final partial prosthesis.

In a preferred embodiment, the distances between the elevations and depressions and/or their heights or depths are not constant over the entire block or blank. For example, the vertex lines of elevations and depressions with large distances and/or heights or depths may pass through or near the centre of the block or blank. In this embodiment, the vertex lines of elevations and depressions with small distances and/or heights or depths run in the peripheral region of the block or blank. In this embodiment, partial prostheses which are machined, in particular milled, in the area of the outer lines automatically have smaller dimensions than partial prostheses which are machined, in particular milled, in the area of the lines which run through or near the centre of the block or blank. A reversed design, i.e. with the large distances and heights or depths at the two edge areas of the block or blank, is also possible.

The distances between the elevations and depressions and/or their height or depth can also increase gradually from one side of the block or blank to the other or be designed in any other arrangement. Typically, molars and premolars are needed more frequently than canines and incisors, and thus the space in the blank can be adapted to the requirements in a simple manner by the design according to the invention.

In a further embodiment according to the invention, it is provided that the tooth-coloured material is designed with a colour gradient. In this case, it is provided that at the interface between the two materials a darker shade is selected for the tooth-coloured material and that the shade changes in such a way that it lightens with increasing distance from the flesh-coloured material. This makes it possible in a simple manner to achieve a lifelike appearance of the teeth in the final product by designing the block or blank according to the invention, without the need for extensive post-processing, such as painting the teeth to match the patient's adjacent natural teeth.

According to the invention, a variety of partial prostheses, even for different patients, can be produced from a blank precisely and without the use of (wax) models. This thus ensures the exclusion of transfer defects and at the same time optimal material properties.

In the one-piece design, the two-colour blank means that it is no longer necessary to join the gingival area and the tooth part.

The preferred design according to the invention, namely the intensive bonding of the tooth-coloured and the flesh-coloured material of the blank, results in the advantage that the milling work can be carried out much faster. Only clamping is required for the machining process of both materials. Due to the intensive bonding between the tooth-coloured and the flesh-coloured material and due to the form-fit between them, the strength of the bond is surprisingly also sufficient for milling and the forces applied there.

It is particularly advantageous that the one-piece prosthesis can be finished automatically by a mechanical machining process, in particular by milling in a CAD/CAM unit, with the integration of a control device. With this control device, the exact position of the partial prosthesis in the blank can be determined automatically and/or under user control. Control devices and similar componentry are understood and known to one of ordinary skill in the art.

A CAD/CAM device completes the dental partial prosthesis by determining the exact placement of the partial prosthesis in the blank based on patient-specific data, in particular patient-specific tooth sizes and widths, and generates the prosthesis based on this. In this way, the size of the partial prosthesis is determined on a patient-specific basis and different shapes of the respective dental arch part can be taken into account, i.e. different tooth courses. The required patient data is provided as follows:

First of all, the patient's dental situation is recorded by means of a conventional intraoral scan or an impression with a subsequent 3D scan and passed on to the control device. This marks anatomically relevant points or anatomical points in the relevant area for the subsequent partial prosthesis. These points serve as reference points. Furthermore, the control device determines individual tooth shapes, the rotation and/or the angulation of the teeth and the shape of the base of the partial prosthesis based on the patient's oral situation recorded by a scanning device.

This data is fed to the software of the CAD/CAM device. First, the data of the upper and lower jaw models are imported and positioned correctly in relation to each other. Then the CAD/CAM device automatically creates a proposal for a partial prosthesis, a so-called virtual partial prosthesis, with its control device and makes a suggestion as to where on the blank this could optimally be produced. However, the virtual partial prosthesis and also the suggested placement can be modified by the user, e.g., by the dental technician, on the CAD/CAM device.

In a preferred embodiment, each blank is provided with an individual identification feature, such as a QR code, and also has reference points which allow exact positioning in the CAD/CAM device. Alternatively, it is also possible to implement this by means of an RFID chip. Surprisingly, this also applies when the blank is removed from the device and later clamped again. After a partial prosthesis has been produced from the blank, the control device stores the exact position of the machined area of the blank with the help of the reference points on the blank as well as the individual identification feature of the blank. Thus, the control device automatically knows on which blank which area is still unused and automatically suggests a suitable blank for a virtual partial prosthesis as well as an optimal placement on it.

It is also possible to use the CAM data of already manufactured blanks for nesting. Furthermore, it is possible to provide a camera in the milling machine, which is directed at the blank to be processed, possibly partially milled, and provides information about the available areas of the blank via image recognition.

It is also possible that the control device performs a so-called nesting of several virtual partial prostheses on one or more blanks, so that a particularly good material utilization is achieved. For this purpose, the control device optimizes the position for the respective virtual partial prostheses and takes into account in particular already partially processed blanks. If an optimal placement is not possible, or if there are no longer enough new blanks, the software gives a corresponding warning signal.

Once the control device has determined an optimal placement, it suggests this to the user, for example by means of a pop-up window, so that the user can confirm it. However, it is also possible to automatically pass on the placement to the CAD/CAM device without the need for confirmation from the user. Here, the determined data are automatically released for further processing and forwarded for the generation of the partial prosthesis of a milling machine of the CAD/CAM device, in which a two-colour blank according to the invention, in particular a two-colour, already partially processed blank, is or is clamped and produces the desired partial prosthesis. After a final polish, the finished partial prosthesis can be delivered to the dentist for integration.

In a modified embodiment, it is provided that during the milling process connecting webs remain between the partial prosthesis to be produced and the remaining blank, so that the partial prosthesis can be prevented from falling out during the milling process, even if the blank should be rotated or tilted in three-dimensional space. This makes it possible to use any conventional milling machines for a blank according to the invention without the need for special modifications of the milling machine.

Based on the patient data obtained, the control device can be used to determine the individual tooth shape, but also the rotation and angulation of the teeth, as well as the shape of the base of the partial prosthesis, so that partial prostheses can be realized for every dental situation of a patient occurring in practice.

Thus, for many clinical situations, such as different interdental gap lengths, different tooth sizes, different tooth segments and/or partial prostheses can be individually and monolithically manufactured from a blank block or a blank disc, so that with these blanks and an automated manufacturing process, the manufacturing process of partial prostheses can be significantly simplified.

Blanks of different sizes, i.e. blanks with different totals, can also be realized, comparable to clothing sizes such as "L", "M" or "S".

It is particularly advantageous that, due to the design according to the invention and the alternating elevations and depressions in the cross-section, each elevation of the tooth-coloured material in the finished partial prosthesis follows the visible edge of the tooth at its cervix opposite the gingiva formed by the flesh-coloured material. The resemblance to natural teeth and gums is surprisingly simple in that the flesh-coloured material is at least partially removed, in particular by milling, to such an extent that on the vestibular side the dividing line between the crown-milled tooth-coloured and flesh-coloured materials recedes as a gingival line, in particular opposite both the flesh-coloured material and the tooth-coloured material in the rest. Thus, the finished partial prosthesis can hardly be distinguished from the surrounding teeth.

By designing the interface between the tooth-coloured and the flesh-coloured material according to the invention, several partial prostheses of different (tooth) sizes can be produced from one blank.

According to the invention, it is particularly favourable that in this manufacturing process the individual teeth of a partial prosthesis remain connected to each other via connection points made of tooth-coloured material. This makes it surprisingly possible to improve resistance to chewing forces, i.e., in particular to lateral shear forces, compared to conventional partial prostheses, in which conventional individual teeth are glued into a base.

Whereas individually manufactured and fabricated teeth are typically accommodated in tooth cavities in a prosthesis base manufactured according to the state of the art and are subjected to considerable shear loads due to the leverage effect of the chewing forces during mastication, which also place a heavy load on the adhesive surface, according to the invention, it is intended to minimise these shear forces by means of the design of the partial prosthesis according to the invention, in particular the special design of the interface between tooth-coloured and flesh-coloured material, and the connection of the teeth to form a bridge extending over the entire partial prosthesis. According to the invention, the feared loosening of the bonding of the single tooth is eliminated, because the connection of at least two adjacent teeth of the partial prostheses shows lower shear stresses due to the increased bonding surface during mastication.

BRIEF DESCRIPTION OF THE DRAWINGS

Further advantages, details and features result from the following description of several embodiments of the invention on the basis of the drawings.

DETAILED DESCRIPTION

Figures 1A, 1B:
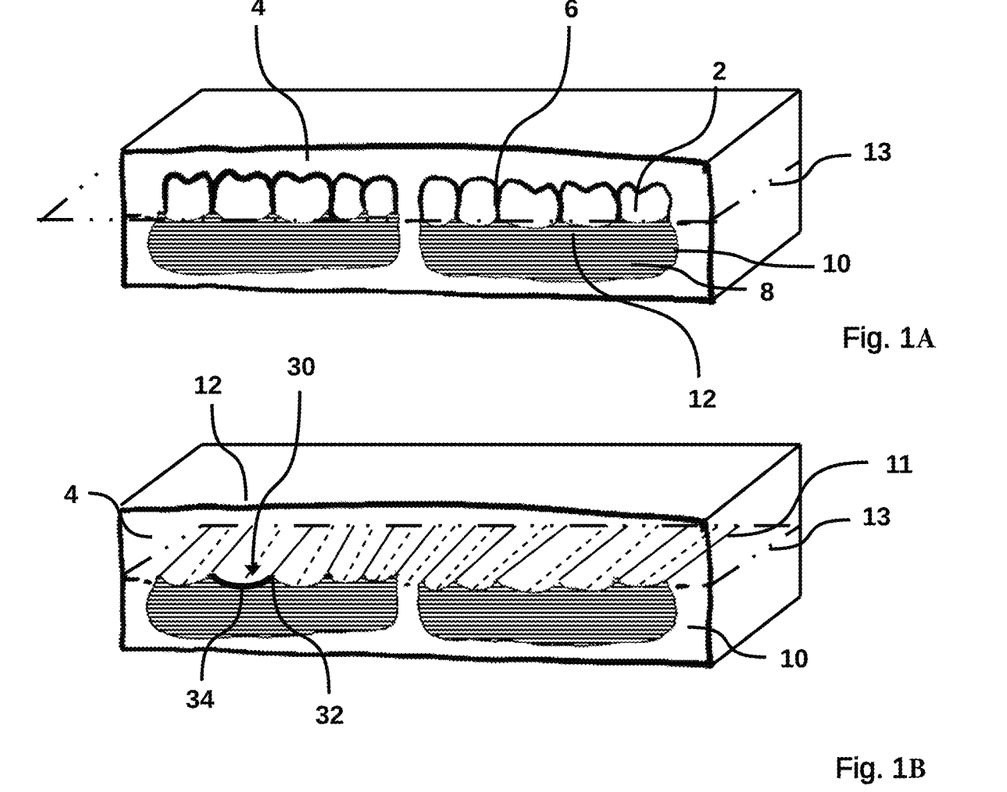
FIG. 1A shows a schematic section through a block according to the invention in perspective view in a first embodiment with possible placements of various virtual partial prostheses.
FIG. 1B shows a schematic section through a block according to the invention in perspective view in a further embodiment.

FIGS. 1A and 1B show a schematic section through a block or blank according to the invention in perspective view. FIG. 1A shows possible placements of several virtual tooth/gingiva parts 1. The teeth 2, in particular connected by joints 6, consist of tooth-coloured material 4 and the prosthesis base 8 of flesh-coloured material 10. The two materials are intensively bonded to each other at their interface 12, in particular polymerised or bonded to each other.

The tooth/gingiva parts 1 are made from a two-colour block or blank. The plane 13 passing through the interface 12 between the two materials is perpendicular to the height, and thus horizontal in FIGS. 1A and 1B. In FIG. 1A the plane 13 is shown at a side view.

FIG. 1B shows the arrangement of the interface 12 in a block according to the invention with the vertex lines 11 according to the invention in perspective view. Here, the three-dimensional embodiment of the flesh-coloured material 10 is shown at the interface between materials 4 and 10.

In the top view, the plane 13 runs as a sectional plane through the interface 12 according to the invention between the tooth-coloured material 4 and the flesh-coloured material 10. Even though this is shown in FIG. 1A, the plane 13 and thus the general course of the interface 12 between the two materials does not have to run horizontally in the blank. Rather, the plane 13 can also run at an angle or be curved. The blank can be block-shaped or round. In the block-shaped embodiment, the plane 13 passing through the interface 12 between the two materials runs horizontally in the flat block. In another embodiment, a plane 13 passing through the interface 12 and running obliquely in the blank is realised and thus also an interface 12 running obliquely in the blank.

As shown in FIG. 1B, the interface 12 between the materials of the block, as viewed along the plane 13 and perpendicular to the vertex lines 11 according to the invention, has a succession of elevations 32 and depressions 34. The vertex lines 11 of a depression 34 or an elevation 32 each form a line, in particular a straight line, which is parallel or at least approximately parallel to the interface. However, a slight inclination towards or away from the boundary surface is also possible. This inclination can be 0.5 degrees, 1 degree, 2 degrees, 4 degrees, 7 degrees, 10 degrees, 15 degrees, 20 degrees or any value between 0 degrees and 30 degrees.

Furthermore, the individual vertex lines 11 of the elevations 32 and depressions 34 each run essentially parallel to each other. The vertex lines 11 protrude from the plane. The vertex lines 11 of the elevations 32 extend to the figures above level 13 and the vertex lines 11 of the depressions 34 below the plane 13.

The tooth-coloured material 4 has exactly the negative shape of the flesh-coloured material 10 at the interface 12 between the two materials. Thus, the interface 12 between the materials has linear elevations 32 and depressions 34 and the two materials interlock. Between these extend transitions which form sloping surfaces or, as it were, slopes. In cross-section, which is perpendicular to the linear elevations 32 and depressions 34 and also perpendicular to the plane 13, the interface 12 between the two materials thus has a curved shape. This shape can also be described as chain-line shaped.

If the blank is viewed in cross-section through both materials as shown in FIG. 1B, i.e., perpendicular to the plane of the interface 12, whereby it is assumed here that the flesh-coloured material 10 is at the bottom and the tooth-coloured material 4 is at the top and which cross-section runs perpendicular to the vertex lines 11, the elevations 32 and depressions 34 of the flesh-coloured material 10 at the interface 12 are not symmetrical when reflected on the plane 13. On the contrary, the elevations 32 are rather pointed and the depressions 34 are rather rounded. This design of the interface 12 corresponds to the human gum line and can be compared to a string of Us 30.

The interlocking supports the strength and resistance of the connection of the tooth-coloured material 4 with the flesh-coloured material 10, in particular in the case of a connection via an adhesive joint, against forces acting thereon, for example during the further processing of the blank, but also during the everyday use of the final partial prosthesis. The asymmetry of the interface, on the other hand, allows easy fabrication of tooth/gingiva parts 1, which have a particularly natural appearance, since the tapering elevations 32 of the flesh-coloured material 10 automatically resemble the natural course of the gums in the interdental region. The rounded depressions 34 of the flesh-coloured material 10, i.e., the rounded elevations of the tooth-coloured material 4 in the negative form, provide the natural tooth shape. In order to achieve a natural appearance, the tooth/gingiva parts 1 thus only have to be milled out of the blank at suitable points, i.e., at points which are identified by the control device of the CAD/CAM device as suitable and preferably also the most space-saving. As a final finishing operation, only a finishing milling of the gingival margin at the transition area between flesh-coloured and tooth-coloured material 4, 10, respectively, is necessary.

Figure 2A:
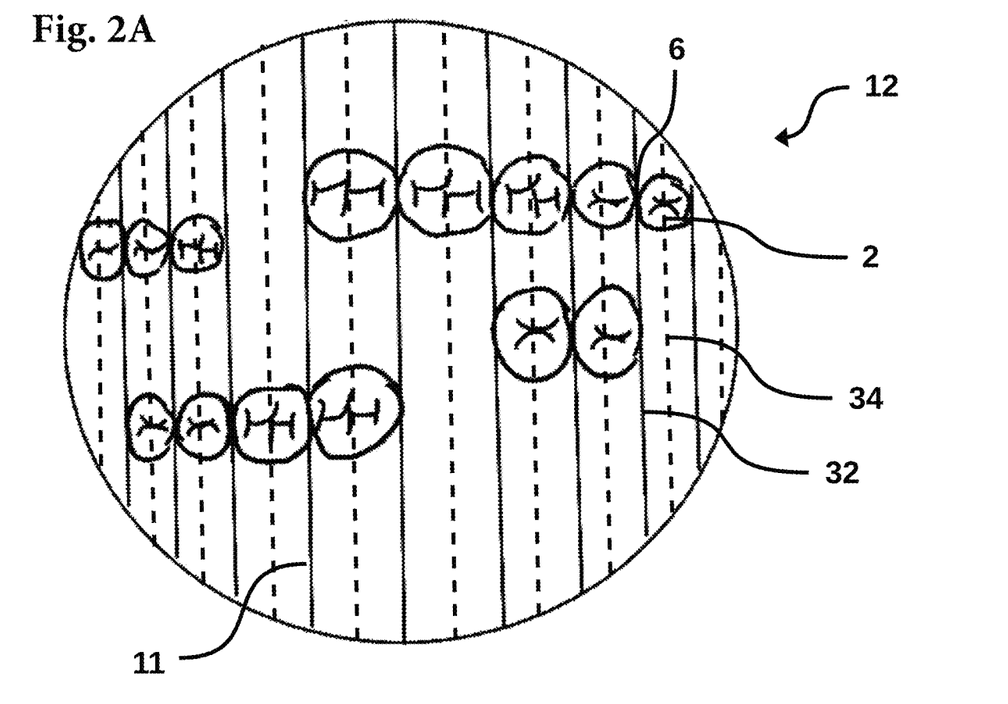
FIG. 2A shows a schematic representations of a further embodiment of the inventive interface between the tooth-coloured and the flesh-coloured material and possible positioning of teeth of different sizes in a disc-shaped blank.
Figure 2B:
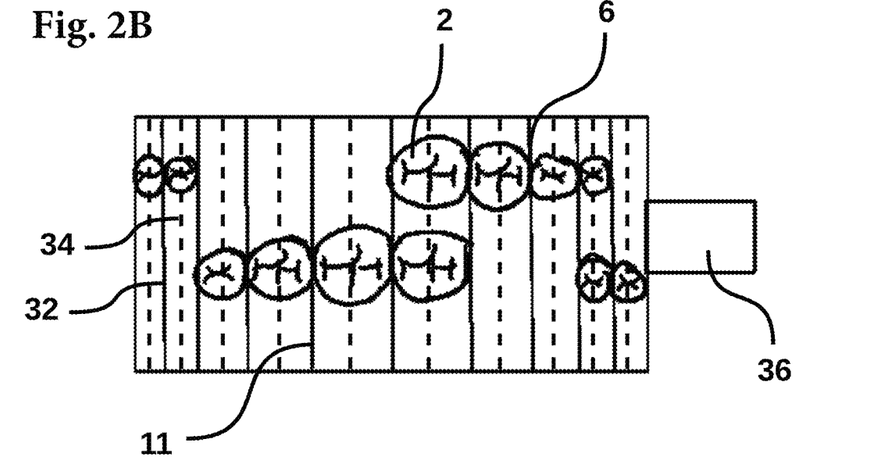
FIG. 2B shows a schematic representations of a first embodiment of a block according to the invention in top view and possible positioning of a partial prosthesis.
Figure 3A:
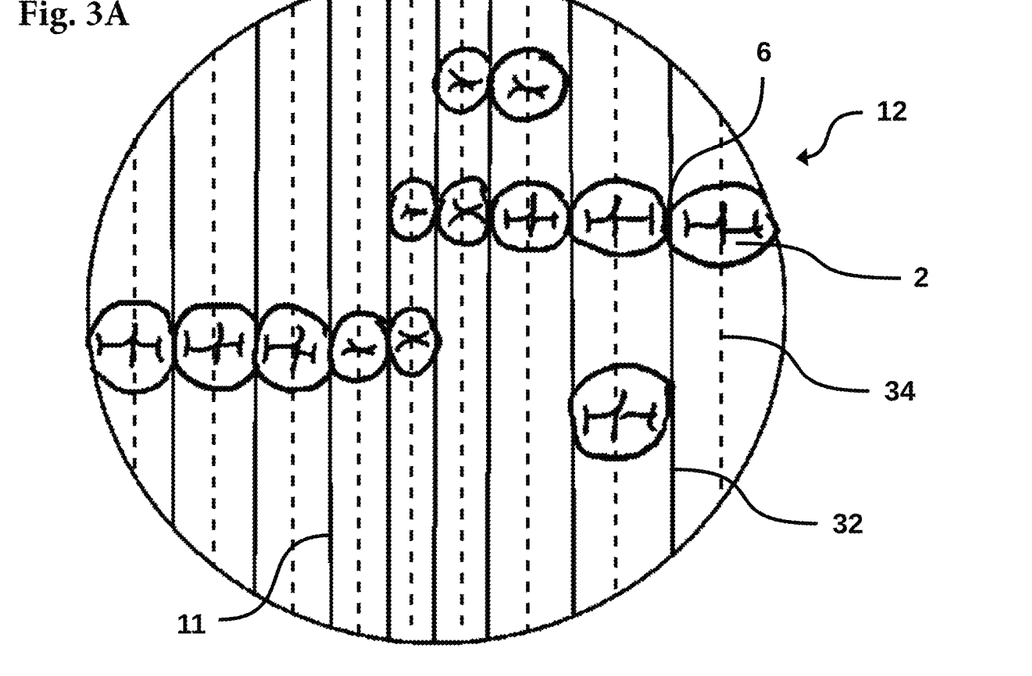
FIG. 3A shows a schematic representations of a further embodiment of the inventive interface between the tooth-coloured and the flesh-coloured material and possible positioning of teeth of different sizes in a disc-shaped blank.
Figure 3B:
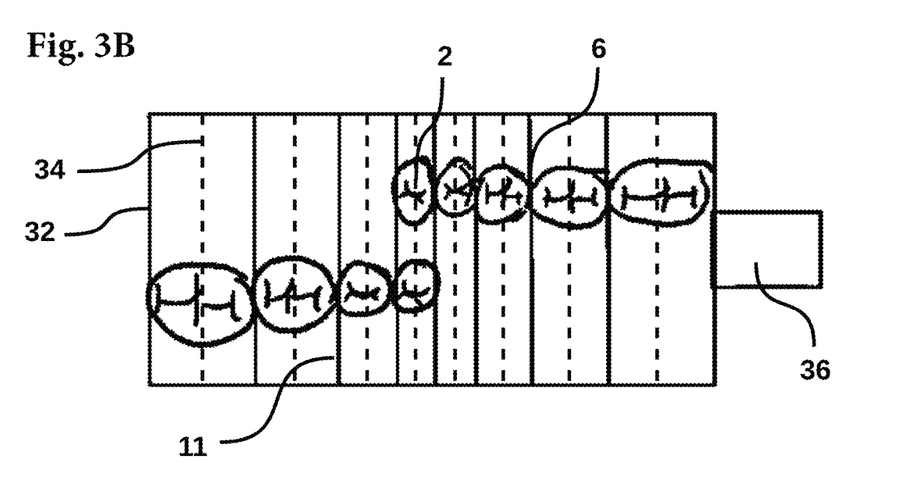
FIG. 3B shows a schematic representations of a first embodiment of a block according to the invention in top view and possible positioning of a partial prosthesis.
Figure 4A:
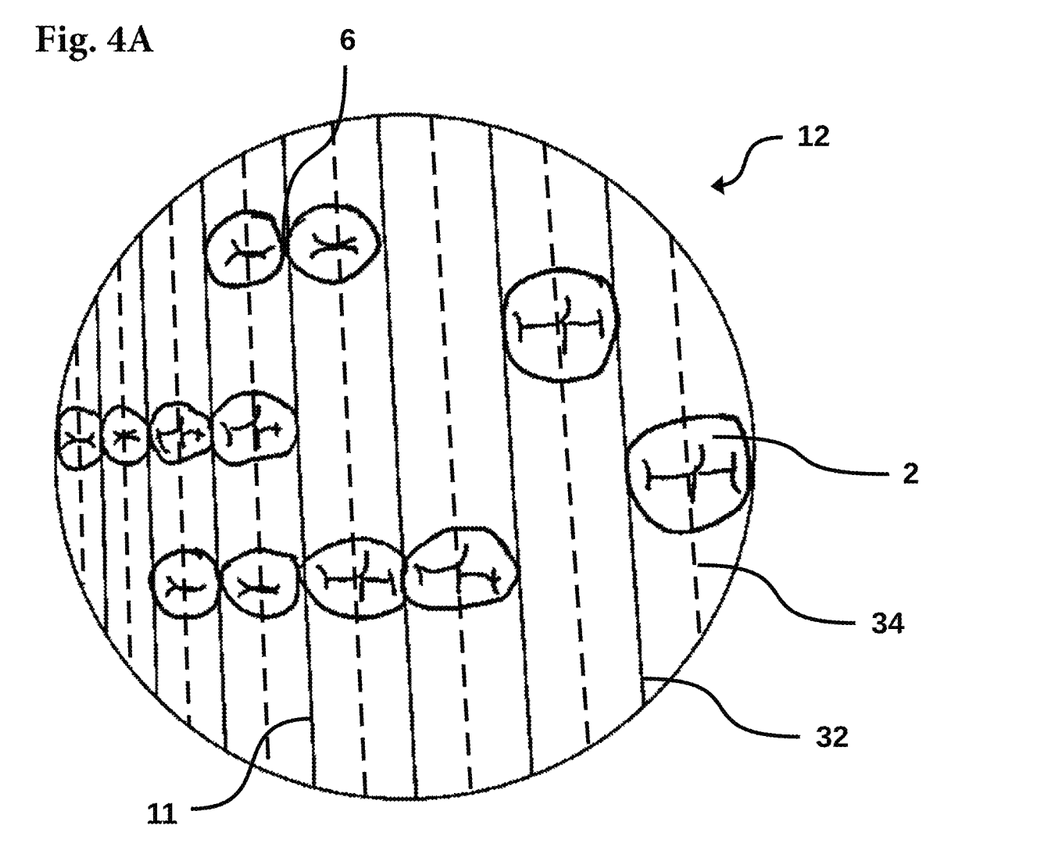
FIG. 4A shows a schematic representations of a further embodiment of the inventive interface between the tooth-coloured and the flesh-coloured material and possible positioning of teeth of different sizes in a disc-shaped blank.
Figure 4B:
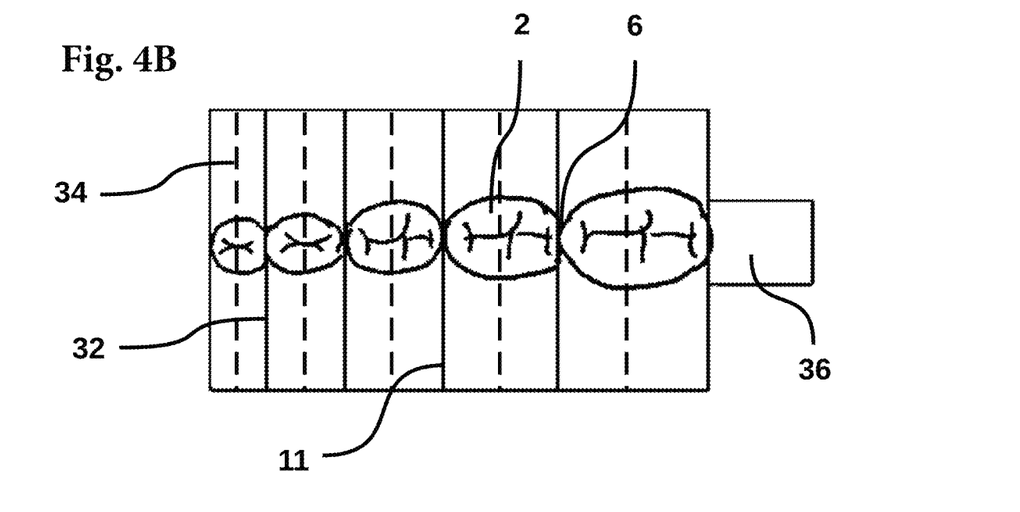
FIG. 4B shows a schematic representations of a first embodiment of a block according to the invention in top view and possible positioning of a partial prosthesis.

FIGS. 2A and 2B, 3A and 3B as well as 4A and 4B show schematic representations of several embodiments of a blank according to the invention, namely a disk in FIGS. 2A, 3A and 4A and a block in FIGS. 2B, 3B and 4B. The representation in these figures is intended to show the interface 12 between materials 4 and 10 (cf. FIGS. 1A and 1B). Several parallel lines are shown, each of which runs across the disk or the block. Dashed lines correspond to vertices or vertex lines 11 of the recesses 34—this position then corresponds to the centre of a tooth of the manufactured partial prosthesis. Solid lines correspond to vertices or vertex lines 11 of elevations 32, which correspond to the interdental spaces, the papillae, i.e. in the partial prosthesis the junctions 6 between the individual teeth 2. Both figures refer to the flesh-coloured material 10.

In addition, possible positions of teeth and tooth arrangements 2 are drawn in FIGS. 2A and 2B. These correspond to the teeth of the partial prostheses which are to be milled out of the block according to FIG. 2B and the disc according to FIG. 2A later.

Another particular advantage of a disc-shaped blank with a diameter of e.g., just under 100 mm is that a large number of positions are available for the arrangement of partial dentures. Such a blank can also be used for considerably more partial dentures than shown in FIG. 2A. The apex lines of the elevations and depressions, which extend completely and uninterruptedly across the blank, make it possible to arrange the partial dentures in any desired distribution, even, as shown in FIG. 2A, adjacent to the edge of the disc-shaped blank.

FIGS. 2A and 2B shows a waveform in the interface 12 between materials 4 and 10, in which the distances between the vertex lines 11, which are close to the centre of the blank, are further apart than the distances between vertex lines 11 closer to the edge of the blank. As a result, large tooth sizes can be realized here near the centre of the blank and smaller tooth sizes near the edge of the blank. A smaller line spacing corresponds to a less high waveform and a larger one to a higher waveform.

If the teeth of a partial prosthesis or a tooth/gingiva part are to be large, the partial prosthesis is positioned in the middle, and if small, on the left or right edge of the blank.

It is understood that the exact shape of the chain line or wave, i.e. the shape of the slopes between the elevations and depressions, can also be varied at will, so that bulkier or slimmer teeth can be realized if necessary.

It is also possible to vary the shape of these oblique areas or slopes along the vertex lines 11. The choice of the position of the teeth on the vertex lines 11 then determines the shape of the individual tooth or teeth of the partial prosthesis in question.

Even though only premolars and molars forming the partial prosthesis are shown in FIGS. 2A to 4B, it is understood that partial prostheses comprising incisors and/or canines can equally be produced, in a curved course of the tooth arrangement corresponding to the human dental arch.

The embodiment according to FIGS. 3A and 3B differs from that according to FIGS. 2A and 2B only in the distribution of the lines. Here the distances between the vertex lines 11, which are close to the centre of the blank, are closer together than the distances between vertex lines 11 closer to the edge of the blank. In this embodiment, small tooth sizes are provided in the centre area of the blank and large tooth sizes are provided at the left or right edge of the blank.

The embodiment according to FIGS. 4A and 4B differs from that according to FIGS. 2A and 2B as well as 3A and 3B also in the distribution of the lines. Here the distances between the vertex lines 11 further to the left in the blank are smaller than the distances between vertex lines 11 further to the right. Accordingly, small tooth sizes can be arranged in the left area of the blank and large tooth sizes in the right area of the blank.

Instead of the linear increase or decrease of the distance between the vertex lines 11, as shown here, a logarithmic or also an irregular or arbitrary increase/decrease of the line distances is also possible in order to meet special requirements.

Furthermore, it is also possible to let the vertex line array diverge over your course. The deviation from parallelism can take 0.5 degrees, 1 degree, 2, degrees, 4 degrees, 7 degrees, 10 degrees, 15 degrees, 20 degrees or any value between 0 degrees and 30 degrees for adjacent vertex lines.

Nor is it necessary that the vertex lines 11 run exactly straight. The course may have a ripple or other change of direction, both in the direction of the adjacent vertex lines 11 and in the direction of height. This allows in a simple way variations in the size of the tooth/gingiva parts 1 to be produced and in particular irregular variations in tooth sizes, for example an unusually small tooth between normally large teeth, or vice versa. Such a sequence of shapes is sometimes also found in natural teeth.

The blocks according to the invention can be manufactured in different sizes in order to achieve a finer adaptability of dimensioning. Blocks in sizes "L" can be made for large tooth/gingiva parts, "M" for average sized tooth/gingiva parts and "S" for small tooth/gingiva parts.

In FIGS. 2B, 3B and 4B a holder 36 is shown, which is used for clamping the block according to the invention in the clamping device of the CAM device. This holder 36 can, for example, be glued to the block according to the invention.

A screw connection of the holder 36 on the block, a form-fitting plug connection or a single-piece design of the holder 36 and the block is also possible. The holder 36 may, for example, be made of flesh-coloured and/or tooth-coloured material, of another plastic or also of metal and may be adapted in its shape to the requirements of the clamping device of the respective CAM device.

It is also possible that the block be manufactured with a structure rotated by e.g., 45° compared to the embodiments shown. The vertex lines 11 are then not parallel to a side surface of the block, but diagonally or obliquely and essentially parallel to the interface of the block.

It is understood that for the production of a cuboid block, as shown in FIGS. 2B, 3B and 4B, it is not necessary to mill it from a disc-shaped blank, as shown in FIGS. 2A, 3A and 4A. Rather, the block can be produced directly in cuboid form.

Figure 5A:
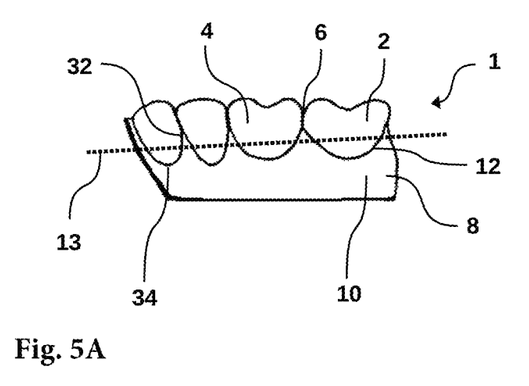
FIG. 5A shows a schematic section through a tooth/gingival part prepared according to the invention, consisting of a gum-coloured and a tooth-coloured material in a first embodiment.
Figure 5B:
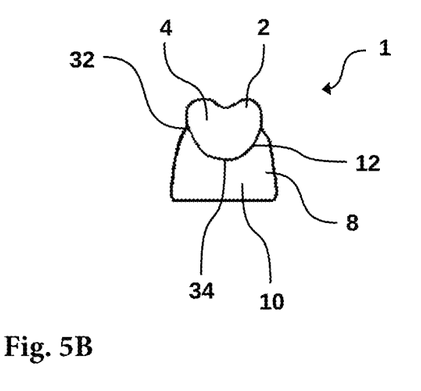
FIG. 5B shows a schematic section through a partial prosthesis part or tooth/gingival part prepared according to the invention, consisting of a gum-coloured and a tooth-coloured material in a further embodiment.

FIGS. 5A and 5B show a schematic section through a tooth/gingiva part 1 milled from the blank or block according to the invention. The teeth 2 consist of tooth-coloured material 4 and the gingiva part 8 of flesh-coloured material 10. The two materials are intensively bonded to each other, in particular polymerised or bonded to each other, at their interface 12 in advance, i.e., already in the blank. FIG. 5A shows a multi-part, here a four-part, tooth/gingiva part. The teeth 2 made of tooth-coloured material 4 are connected to each other at connection points 6.

FIG. 5B shows a one-piece tooth/gingiva part, a so-called single tooth prosthesis. The tooth/gingival parts 1 are prepared from a flat, possibly disc-shaped, two-tone block or blank, as shown in FIGS. 1 to 4.

The terms "about" and "substantially" are intended to include the degree of error or uncertainty associated with measurement of the particular quantity or shape as one of ordinary skill in the art would understand.

Some embodiments may involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, a personal computer microprocessor, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A block comprising
   an upper surface and a lower surface, wherein the block comprises a flesh-coloured material and a tooth-coloured material,
   wherein the flesh-coloured material and the tooth-coloured material are connected to each other and wherein an interface between the flesh-coloured material and the tooth-coloured material with elevations and depressions formed in or at the interface extends through an optionally curved plane, said optionally curved plane is parallel to or oblique to at least part of the upper surface and the lower surface of the block,
   wherein vertex lines of all of the elevations and depressions, as viewed in a plan view of the interface, form substantially straight lines and are substantially parallel to each other,
   wherein the vertex lines of all of the elevations and depressions extend completely and uninterruptedly across the block.

2. The block according to claim 1,
   wherein the vertex lines of the elevations and depressions run parallel or substantially parallel to the interface.

3. The block according to claim 1,
   wherein the vertex lines are at a constant distance from one another, or
   wherein the distances between the vertex lines as viewed in the plan view of the interface are different.

4. The block according to claim 1,
   wherein the tooth-coloured material, and/or the flesh-coloured material, comprises a colour gradient and/or is continuously and increasingly transparent with increasing distance from the interface between the flesh-coloured material and the tooth-coloured material.

\* \* \* \* \*